United States Patent Office 3,364,169
Patented Jan. 16, 1968

---

3,364,169
POLYOLEFIN STABILIZER COMPOSITION
Hendrikus J. Oswald, Morristown, and Edith Turi, Livingston, N.J., assignors to Allied Chemical Corporation, New York, N.Y., a corporation of New York
No Drawing. Filed Dec. 16, 1963, Ser. No. 330,641
1 Claim. (Cl. 260—45.95)

ABSTRACT OF THE DISCLOSURE

A synergistic stabilizing of polyolefins against the decompositional affects of ultraviolet light is obtained by the incorporation therein of 0.001 to 4% by weight in essentially equal amounts of 2-hydroxy-4-alkoxybenzophenone having alkoxy chains of 8–20 carbon atoms in combination with a phosphite of the formula:

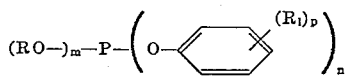

wherein R is an alkyl group of 8–18 carbon atoms, $R_1$ is an alkyl group of 1–9 carbon atoms, $m$ and $n$ are cardinal numbers totaling 3, and $p$ is a cardinal number from 1 to 3.

---

This invention relates to the stabilization of aliphatic poly-α-olefins against the decompositional effects of ultraviolet light.

In recent years, aliphatic poly-α-olefins have found extensive use in the preparation of a wide variety of manufactured products. In the outdoor use of these materials it was quickly discovered that they were subject to rapid deterioration by weathering, due primarily to the combined effects of sunlight and atmospheric oxidation. It has been suggested that the mechanism of deterioration of aliphatic poly-α-olefins occurs by the diffusion, and thence physical binding, of molecular oxygen into the structure of said polymers. Upon exposure to sunlight or other sources of ultraviolet irradiation, sufficient energy is imparted to the oxygen-containing regions of the poly-α-olefin to catalyze oxidation of said polymer. It has been also suggested that the earliest stages of oxidation are characterized by scission of the polymer chain with the formation of carbonyl groups. As said irradiation is continued the polymer is further degraded. Such further degradation is characterized by a loss in molecular weight of said polymer, a darkening in color, and a decrease in such physical properties as tensile strength to the point of mechanical failure.

A variety of stabilizers used in the prior art provide protection against deterioration of poly-α-olefins only for relatively short durations, therefore, there is a long felt need for materials that would stabilize the initial physical properties of such polymers for longer periods of use.

Hence, it is an object of the invention to provide a stabilizer composition capable of stabilizing aliphatic poly-α-olefins against the degradative effects of ultraviolet light for longer periods than have heretofore been obtained.

According to the invention it was discovered that homo and copolymers of aliphatic α-olefins containing 2 to 6 carbon atoms can be stabilized against the decompositional effects of ultraviolet light by incorporating into the body of said polymers a synergistic combination of stabilizing agents comprising 2-hydroxy - 4 - alkoxybenzophenone, wherein the alkoxy group contains 8 to 20 carbon atoms, the benzophenone being present in a concentration of 0.0005 to 2 percent by weight of the polymer, and 0.0005 to 2 percent by weight of said polymer of at least one compound having the formula

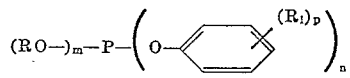

wherein R is an alkyl group containing 8–18 carbon atoms, $m$ and $n$ are cardinal numbers totaling 3, $p$ is a cardinal number between 1 and 3, and $R_1$ is an alkyl group consisting of 1–9 carbon atoms.

Compounds characterized by the above formula are known antioxidants for synthetic rubbers, and 2-hydroxy-4-alkoxybenzophenones, wherein the alkoxy group contains 8 to 20 carbon atoms are known for their ultraviolet light absorbing characteristics. The new and unexpected effect according to the invention resides in the discovery that by combining these known materials synergistic improvement in the permanency of thus stabilized aliphatic poly-α-olefins is obtained, which is considerably and unexpectedly greater than the additive effect which would normally be expected from the individual compounds.

In a preferred embodiment of the invention, the above characterized phosphite compound is a 2-ethylhexyl octylphenyl phosphite, preferably a mixture of 2-ethylhexyl bis (octylphenyl) phosphite, and bis (2-ethylhexyl) octylphenyl phosphite. The two phosphites are present in approximately equal weight proportions, with a few percents more of the bis (2-ethylhexyl) octylphenyl phosphite being present. This mixture will be referred to hereinafter as EHOPP; it is a commercially available composition.

The aliphatic-α-olefin polymeric compositions for which the stabilizer combination of the invention is effective, are composed of recurring units containing from 2 to 6 carbon atoms, and are, for instance, polymers of ethylene, propylene, 1-butene, pentene, and 4-methyl-1-pentene. Although 2-hydroxy-4-alkoxybenzophenones, wherein the alkoxy group contains 8 to 20 carbon atoms, are used for stabilizing the above polyolefins, particular optimum carbon atom ranges are found within the 8 to 20 carbon atoms range for any particular polyolefin composition, giving optimum compatibility with a given polyolefin variety.

In a preferred embodiment of the invention, the stabilized, aliphatic, poly-α-olefin composition is prepared by impregnating an aliphatic poly-α-olefin with a mixture comprising 0.5 to 1 percent by weight on said polymer of EHOPP, and 1 to 2 percent by weight on said polymer of 2-hydroxy-4 - dodecoxybenzophenone (dodecyloxybenzophenone). The impregnation of the poly-α-olefinic material can be accomplished by chemical or mechanical means. If desired, the polymer can be suspended in a solution of a suitable organic solvent such as acetone, carbon tetrachloride, diethyl ether, ethanol, benzene or the like, the solvent containing EHOPP and 2-hydroxy-4-dodecoxybenzophenone. Subsequently the solvent is removed by evaporation to produce a dry, stabilizer-impregnated poly-α-olefin. Alternatively, the stabilizing ingredients can be combined with the poly-α-olefin by milling them together, or by mechanical admixture followed by extrusion.

Although the preferred concentration of EHOPP and 2-hydroxy dodecoxybenzophenone in the polymeric α-olefin are 0.5 to 1, and 1–2 percent by weight, respectively, weight percentages of each of the said ingredients ranging from 0.0005 to 2 percent by weight are applicable to accomplish the improvements of the invention. The proportion of the stabilizer ingredients to one another is not critical.

The EHOPP employed in the following examples is a commercially available mixture of 2-ethylhexyl bis (octylphenyl) phosphite and bis (2-ethylhexyl) octylphenyl phosphite possessing the following physical properties:

Specific gravity, 20°/4° _____ 0.935–0.950
Refractive index, $n_D^{25}$ _____ 1.483–1.493
Flash point; Cleveland Open Cup _____° F__ 385–390
Viscosity at 77° F. _____centistokes__ 43.4–69.0

The poly-α-olefin employed in the following illustrative examples is a low pressure polypropylene prepared in accordance with Italian Patent No. 647,788, Example 6.

The following specific example illustrates the invention in further detail. Parts and percentages are by weight, and temperatures are in degrees centigrade.

EXAMPLE

In tests 1–5 outlined below, 10 parts polypropylene were suspended in 20 parts of an acetone solution, containing the various stabilizer compositions of the examples, and stirred under an inert atmosphere at room temperature until the acetone evaporated. The remaining solids were thoroughly mixed, with 190 parts of additional polypropylene. The resulting homogenous mixture was milled at 185° C. for 5 minutes and then molded into 10 mil thick test samples. The irradiation of the test samples was conducted with a 275 watt Westinghouse RS Sunlamp producing a visible illumination intensity of 720 foot candles at the testing distance. Due to the infrared emission of the lamp, the temperature of the samples during the irradiation was approximately 40° C. Approximately 5 percent of the total lamp emission was in the ultraviolet range.

Table I summarizes the various stabilizer compositions used in tests 1 to 5 (the percentages being based on the weight of the polymer).

Table I

Test No.:          Compound
1 ____ 1% 2-hydroxy-4-dodecoxybenzophenone
       +0.5% EHOPP.
2 ____ 1.0% 2-hydroxy-4-dodecoxybenzophenone.
3 ____ 0.5% EHOPP.
4 ____ No stabilizer.
5 ____ 1% 2-hydroxy-4-dodecoxybenzophenone with a bromine substitution in the meta-position
       +0.5% EHOPP.

The ultimate elongation expressed in percent and the ultimate tensile strength expressed in lb./in.² of the samples irradiated for different durations were determined in accordance with ASTM No. D–638–58 T. In Table II the term "initial properties" refers to the product of these two values. The various stabilized polypropylenes are referred to by their test numbers, and the center three columns give the percentage retention of the "initial properties," as above defined, after 10,100, and 1,000 hours irradiation, respectively. The last column summarizes the number of hours necessary for 80 percent retention of the "initial properties." Polymers having retained property values below 50 percent are generally considered to be beyond their useful life. The data were obtained by interpolation from curves representing the measured values.

TABLE II

| Test No. | Irradiation time (hrs.) | | | Irradiation time (hrs.) after which 80% of "initial properties" is retained |
|---|---|---|---|---|
| | 10 | 100 | 1,000 | |
| 1 | 105 | 108 | 96 | (¹) |
| 2 | 96 | 88 | ² 40 | 400 |
| 3 | 110 | 117 | 56 | 840 |
| 4 | 36 | ² 1 | _____ | 1.9 |
| 5 | 104 | 106 | ² 60 | 780 |

¹ Over 2,000 (by extrapolation, over 4,000).
² Failing.

It is readily apparent from Table II that an unexpected synergistic effect is accomplished by the combined use of EHOPP and 2-hydroxy-4-dodecoxybenzophenone, while this synergistic effect is not present even with as closely related a compound as the bromine substituted analogue which has been suggested for stabilization.

We claim:
1. A stabilized polypropylene resin composition comprising polypropylene having incorporated therein 0.005% to 2% by weight of said resin of 2-hydroxy-4-dodecyloxybenzophenone and 0.5 to 1 percent by weight of said resin of a mixture containing 2-ethylhexyl bis (octylphenyl) phosphite and bis (2-ethylhexyl) octylphenyl phosphite.

References Cited

UNITED STATES PATENTS 3,188,298    6/1965    Williamson et al. _ 260—45.95

DONALD E. CZAJA, *Primary Examiner.*

H. E. TAYLOR, *Assistant Examiner.*